(12) United States Patent
Popov

(10) Patent No.: US 6,897,590 B2
(45) Date of Patent: May 24, 2005

(54) ROTOR ASSEMBLY FOR A PERMANENT MAGNET ELECTRICAL MACHINE COMPRISING SUCH A ROTOR ASSEMBLY

(75) Inventor: Vladimir Vladimirovich Popov, Königsfeld (DE)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/634,835

(22) Filed: Aug. 6, 2003

(65) Prior Publication Data

US 2004/0095033 A1 May 20, 2004

(30) Foreign Application Priority Data

Nov. 15, 2002 (EP) ............................................. 02025490

(51) Int. Cl.⁷ .............................................. H02K 21/12
(52) U.S. Cl. .............................. 310/156.56; 310/156.23
(58) Field of Search ................................. 310/156, 261

(56) References Cited

U.S. PATENT DOCUMENTS

| | | | | |
|---|---|---|---|---|
| 5,604,390 A | * | 2/1997 | Ackermann ............ | 310/156.55 |
| 5,684,352 A | * | 11/1997 | Mita et al. ............. | 310/156.56 |
| 5,962,944 A | | 10/1999 | Narita et al. | |
| 6,008,559 A | * | 12/1999 | Asano et al. ........... | 310/156.53 |
| 6,031,311 A | | 2/2000 | Lee | |
| 6,133,663 A | | 10/2000 | Hoemann | |
| 6,274,960 B1 | * | 8/2001 | Sakai et al. ............ | 310/156.02 |
| 6,441,524 B2 | * | 8/2002 | Kaneko et al. ........ | 310/156.45 |
| 6,445,100 B2 | * | 9/2002 | Tajima et al. .......... | 310/156.57 |

FOREIGN PATENT DOCUMENTS

| | | |
|---|---|---|
| DE | 1995664 | 10/2000 |
| EP | 641059 | 2/1994 |
| EP | 872944 | 11/1998 |
| EP | 1003267 | 11/1999 |
| EP | 1100175 | 10/2000 |
| EP | 1164684 | 6/2001 |
| GB | 1503708 | 8/1975 |
| JP | 2000152534 | 11/1998 |
| JP | 2001095182 | 6/2001 |
| WO | W/O 83/00956 | 11/1981 |

* cited by examiner

*Primary Examiner*—Burton Mullins
(74) *Attorney, Agent, or Firm*—Duane Morris LLP

(57) ABSTRACT

Rotor assembly for an electrical machine, including a body of generally cylindrical shape having an inner opening, wherein slots are provided in the body, the slots extending from the inner opening towards the outer periphery of the body; permanent magnets disposed in said slots; wherein at least one of the slots comprises an end section near the outer periphery of the body having an area of enlarged width.

20 Claims, 6 Drawing Sheets

ROTOR ASSEMBLY FOR A PERMANENT MAGNET ELECTRICAL MACHINE COMPRISING SUCH A ROTOR ASSEMBLY

BACKGROUND OF THE INVENTION

The present invention relates to a rotor assembly for a permanent magnet (P.M).electrical machine or a D.C. motor comprising such a rotor assembly. In general, the invention relates to the field of permanent magnet motors and brushless D.C. motors comprising permanent magnets which can be configured to include an inner rotor surrounded by a stator (Innenläufermotor) or an outer rotor configuration (Außenläufermotor). Electrical machines having an interior rotor include a rotor assembly which is mounted on the rotor shaft and one or more permanent magnets as well as a stator assembly, such as a stator laminated from a number of metal sheets, comprising windings. The rotor assembly is coaxially inserted into the stator assembly. In electrical machines having outer rotors, the rotor assembly surrounds the stator.

FIG. 5 schematically shows the general design of an electrical machine, comprising a housing 114, in which are included the stator assembly 118, the rotor assembly 116 as well as bearings 126, 128 for rotatably supporting the rotor assembly. The stator assembly 118 comprises sheet metals 155 and windings 160 and defines an interior cavity into which the rotor assembly 116 can be inserted. The rotor assembly 116 includes the shaft 110, a yoke 112 and permanent magnets 122. The bearings 126, 128 for the rotor assembly can be integrated into a flange 124 of the motor housing 114.

More particularly, the present invention relates to a rotor assembly for an electrical machine, comprising a body of generally cylindrical shape having an inner opening for coaxially mounting the body on a shaft, and permanent magnets embedded in said body.

Rotors including embedded magnets have been generally known and described in the art. A rotor configuration having a multi-pole "spoke" design with radially extending embedded magnets, enclosed by a retaining ring is shown e.g. in "Design of Brushless Permanent-Magnet Motors" J. R. Hendershot Jr. and T J E Miller, Magna Physics-Publishing and Clarendon Press, Oxford, 1994. As shown therein, it is known to have a rotor body with embedded, radially extending magnets which are protected by a ring or tube surrounding the rotor body. The rotor body in which the magnets are embedded has the function of a yoke.

A common form of buried magnets is shown in EP 0 641 059 B1 and EP 0 691 727 B1. These references show a plurality of magnets which are inserted into slots which are formed in the outer rotor surface. With the design disclosed in these references, stray flux is created which passes through the rotor back-iron close to the shaft. Accordingly, magnet energy dissipated in this area can't be used efficiently. Document DE 101 00 718 A1 discloses a similar design wherein the permanent magnets are inserted into slots in the rotor body which are closed at the outer rotor surface. Thereby, the rotor is divided into sectors which need to be mounted on a frame.

WO 00/57537 describes a multipole, permanent-magnet rotor for a rotating electrical machine, manufactured with embedded magnets in a so-called "flux-concentrating style". In the rotor configuration shown in this reference permanent magnets are designed as flat cubes which are arranged in a direction radial to the rotor axis in groove-like gaps between yoke sections fixed in the rotor body. For easily mounting the magnets this document proposes to divide a yoke into two adjacent half-yokes of two poles, wherein magnets are arranged there between to form a pole element which can be fixed independently on the rotor body.

EP 0 872 944 A1. shows another design of a rotor having embedded permanent magnets wherein the magnets are arranged in a radial direction or parallel to a radial direction of the rotor body.

A similar design is shown in EP 0 803 962 B1. The rotor is made of a ferromagnetic material body defining a plurality of radially by extending slots in which are engaged the permanent magnets so as to provide the desired numbers of poles for the rotor. The slots for receiving the permanent magnets are designed with a bridge at the outer periphery of the rotor body and an opening at the inner diameter of the rotor body so that the permanent magnets can be inserted and held in said slots. Trapezoidal elements of the rotor body which are separated by the radially extending slots will form the poles of the rotor.

Further patent documents showing a rotor having embedded magnets are GB 1,177,247, EP 0 955 714 A2 and U.S. Pat. No. 2002/0067096 A1.

The preferred application of the rotor assembly according to the present invention is in a brushless D.C. motor or permanent magnet synchronous motor. Such motors can be used in a wide range of applications such as spindle motors for disc drives, electrical motor power assisted systems in automobiles, e.g. steering and braking systems, power tools and many other applications.

With the radial arrangement of the permanent magnets, as shown and described in the prior art, a problem may arise in that the regular arrangement of the permanent magnets produces a cogging torque effect which is disadvantageous in the operation of the permanent magnet motor. In a rotor assembly having surface-magnets, it is known to provide a skewed magnet arrangement to avoid abrupt switching between phases and thus to reduce a cogging torque, as disclosed e.g. in the above mentioned reference of Hendershot and Miller. Skewed magnetization of the rotor poles, however, creates an axial component of the magnetic force and thus a loss of torque. Further, the problem of the cogging torque produced during operation of the permanent magnet motor has not yet been solved satisfactorily for rotors having embedded magnets of the type described above.

It is therefore an object of the present invention to provide a rotor assembly having embedded magnets which can improve the efficiency of the electrical machine and, in particular, eliminate or reduce the cogging torque.

SUMMARY OF THE INVENTION

This object is solved by a rotor assembly comprising the features of claim 1.

According to the present invention a rotor assembly for an electrical machine is provided, comprising a body of generally cylindrical shape having an inner opening. In the rotor body slots are provided which extend from the inner opening towards the outer periphery of the body, permanent magnets are disposed in said slots. According to the present invention, at least one of the slots comprises an end section near the outer periphery of the body having an area of enlarged width. The area of enlarged width at the outer ends of the slots improve the flux concentration in the air gap between the stator and the rotor.

Preferably, the end sections of the slots, near the outer periphery of the body, are closed to the outside and include recesses or notches creating said area of enlarged widths of the slots. In a preferred embodiment, the permanent magnets which are inserted into said slots do not extend into said area of enlarged widths. In another embodiment the permanent magnets extend partly or fully into said area of enlarged widths. That part of the end section which is not occupied by the permanent magnets can be filled with air or another medium having no magnetic properties. To reduce the cogging torque it is preferred that the permanent magnets do not extend all the way into the area of enlarged width at the outer end of the slots. This results in a configuration where an "empty" end of the slots close to the outer periphery of the rotor assembly is created which has a positive influence on the cogging torque.

By providing an end section of the slots, near the outer periphery of the body, which has enlarged width, in general, it is possible to control the flux concentration through the rotor assembly and the stator and, more particularly, to reduce the cogging torque. The operation of the motor thus can be tuned by choosing an appropriate shape of the end section and controlling the magnet position within the slot.

While the prior art arrangement of embedded magnets provided for only two degrees of freedom for controlling motor parameters, such as the radial distribution of the electromagnetic induction in the air-gap and flux concentration, namely the widths of each magnet and the height of each magnet, the present invention allows four parameters for motor tuning. According to the present invention, the motor can be tuned as a function of the height of each magnet, the width of each magnet, the shape and size of a recess in the end section of the slot containing the permanent magnet, and the length of the permanent magnet extending into said end section. Therefore, it is easier to influence the flux concentration and distribution of the electromagnetic induction in the air gap as with the arrangements according to the prior art. By optimising the arrangement of the magnet sections and the shape of the slot it is possible to reduce the cogging torque without the necessity of any skewing technique which has been used in the prior art. In particular, by forming the end section of the slot with a wider opening, flux can be concentrated through smaller pole areas to change the flux distribution in the air gap and in particular to reduce the cogging torque. Choosing a slot having a narrow end section will lead to higher induction. The cogging torque can be further controlled by varying the position of the permanent magnet in the slot. In particular, a smaller cogging torque, but also a smaller induction, is achieved when the permanent magnet does not extend into the end section.

At the outer periphery of the rotor body, the slots are closed by bridges which protect the magnets against possible mechanical and electromagnetic damage and which connect the poles on the two sides of each magnet. However, these bridges conduct a large portion of stray flux. Therefore, the thickness of the bridges has to be designed carefully to satisfy both requirements regarding protection of the permanent magnets and reduction of stray flux.

According to the present invention, there is no (metal) retaining tube necessary for protecting the permanent magnets and holding the permanent magnets in place. Accordingly, the size of the air-gap can be reduced and the energy from the magnet can be transferred more efficiently to the stator so that there is less energy loss. As a consequence, the volume of magnetic material can be reduced when compared with a surface magnet designed under equal conditions otherwise. Accordingly, with the proposed arrangement of the magnet sections in slots which are closed at the outer periphery of the body the overall efficiency of the motor can be increased.

The present invention provides for a rotor assembly wherein the rotor body forms a magnetic core, with magnets embedded therein. Preferably, the inner opening of the rotor body is configured for mounting the rotor body on a shaft. In particular the body is mounted on the shaft via a hub. The hub should be made of a non-magnetic material.

In an alternative embodiment, the rotor body is configured to surround a stator of the electrical machine, with an air-gap being formed between the rotor and the stator.

In one particular embodiment of the invention, the outer periphery of the body has a convex or concave shape between two adjacent permanent magnets. This serves as an additional measure to control the distribution of the radial component of the electromagnetic induction. In general, the magnetic poles formed between two adjacent permanent magnets can have different shapes to control the distribution of the electromagnetic induction and in particular, different convex or concave shapes.

SHORT DESCRIPTION OF THE DRAWINGS

In the following, the invention is described by way of preferred embodiments of the invention with reference to the drawings.

DESCRIPTION OF THE PREFERRED EMBODIMENTS

Figure 1:
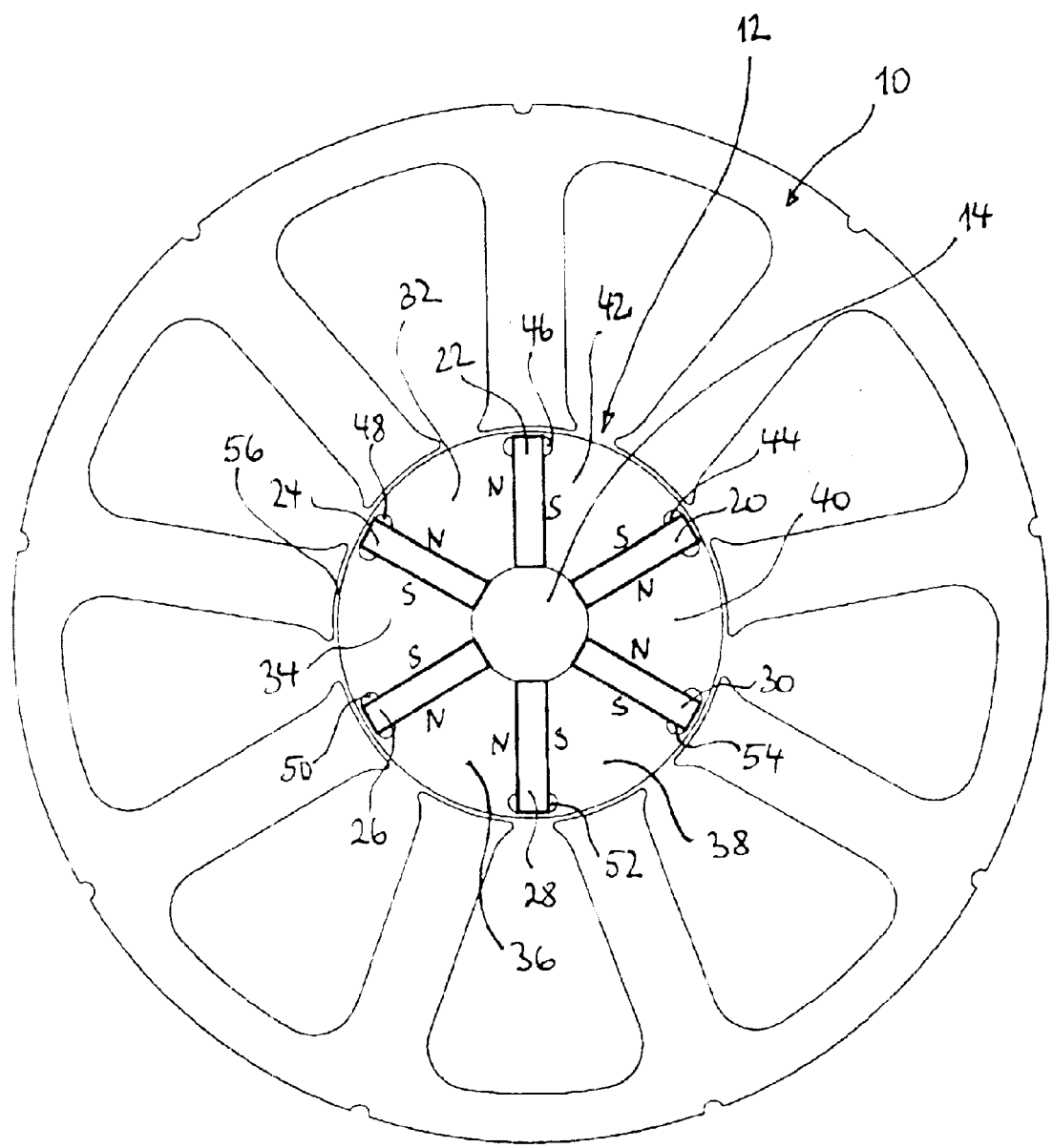
FIG. 1 shows a schematic sectional view through a motor comprising a stator and a rotor assembly according to the present invention.

FIG. 1 schematically shows a sectional view through a permanent magnet motor according to the present invention. The motor comprises a stator 10 and a rotor assembly 12 according to the present invention. The rotor assembly 12 is mounted on a shaft 14. The rotor assembly 12 comprises a rotor body 18, comprising a magnetic core and a yoke, and permanent magnets 20, 22, 24, 26, 28, 30. Magnet poles 32, 34, 36, 38, 40, 42 are formed between the permanent magnets 20 to 30. The magnetisation of the core material of the rotor body 18 is indicated by N (north) and S (south) in the drawing.

The permanent magnets 20 to 30 are embedded in slots (FIG. 2) in the rotor body 18, the slots having end sections 44, 46, 48, 50, 52, 54 of enlarged widths. These end sections 44 to 54 can be formed by recesses or notches provided in the end sections of the slots near the outer periphery of the rotor body 18.

Figure 5:
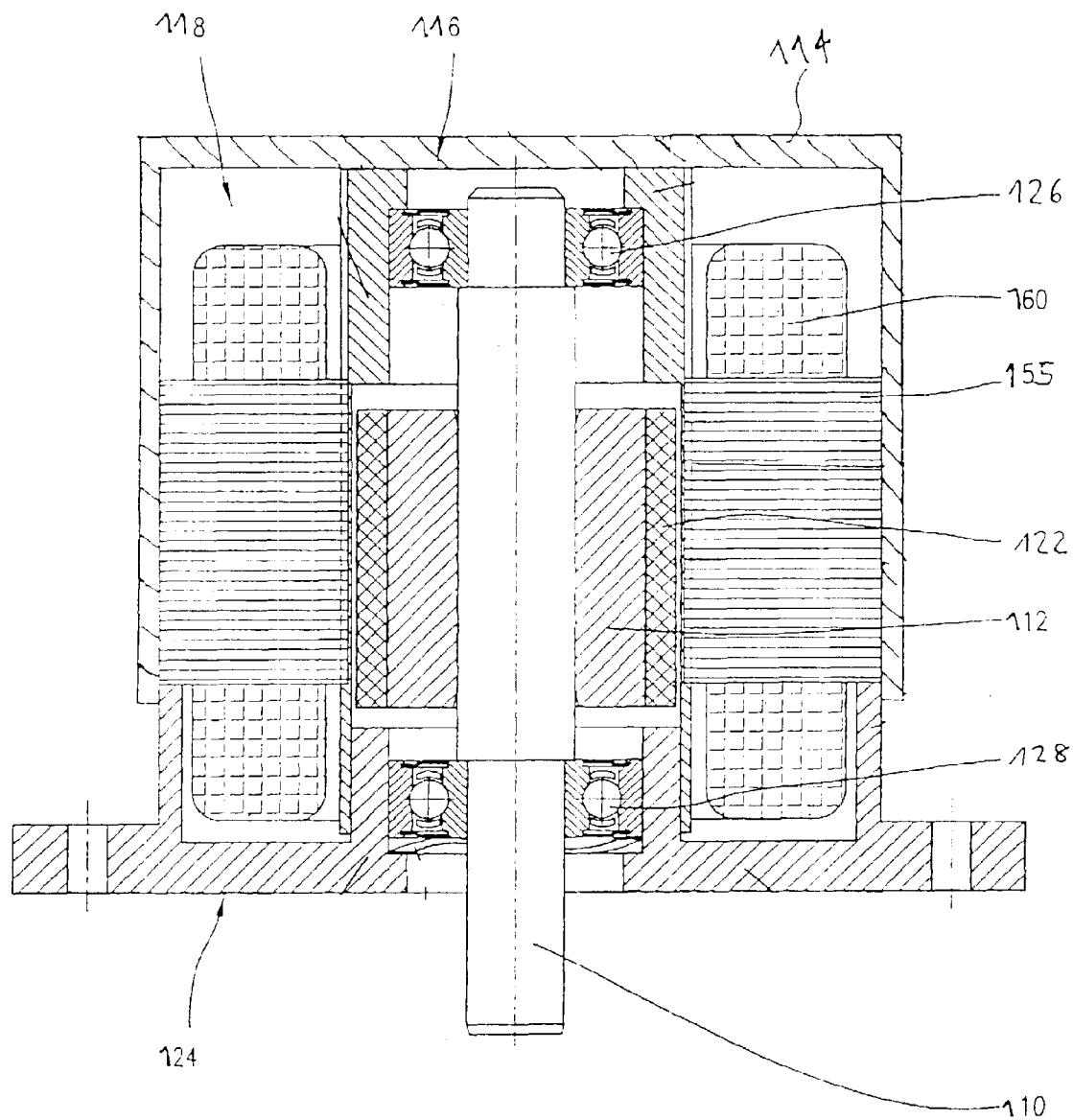
FIG. 5 shows a schematic sectional view in a longitudinal direction through a permanent magnet motor according to the prior art.

Further, an air gap 56 is provided between the stator 10 and the rotor assembly 12, An expert will understand that a permanent magnet motor comprises additional components, such as windings, a housing, electric and electronic control components etc., as shown in FIG. 5.

The invention is described in further detail with reference to FIG. 2 which shows an enlarged view of the rotor assembly according to the present invention. The same components as in FIG. 1 are designated with the same reference numbers. For clarity reasons, the reference numbers of some of the permanent magnets 20 to 30 and poles 32 to 42 are omitted.

The rotor body 18 forms a magnetic core including a yoke and, accordingly, is made from a material having suitable magnetic properties. The shaft 14 can be made from a magnetic or non-magnetic material, as long as magnetic separation between the shaft and the rotor body 18 is ensured. The rotor body 18 can be mounted on the shaft 14 via a hub (not shown).

The magnets 20 to 30 are provided in slots 58 which are formed in the rotor body 18. The slots 58 are open at an inner opening 62 of the rotor body 18 and they are closed by relatively thin bridges 64 at the outer periphery of the rotor body 18. The magnets 20 to 30 can be inserted into the slots 58 from the inner opening 62 of the rotor body 18 and are securely held therein. The bridges 64 at the outer periphery of the rotor body 18 protect the magnets 20 to 30 against any mechanical and electromagnetic damage. As these bridges conduct the significant portion of stray flux, it is important to carefully define the thickness of these bridges 64 to satisfy the requirements regarding both mechanical stability and stray flux.

Figure 2:
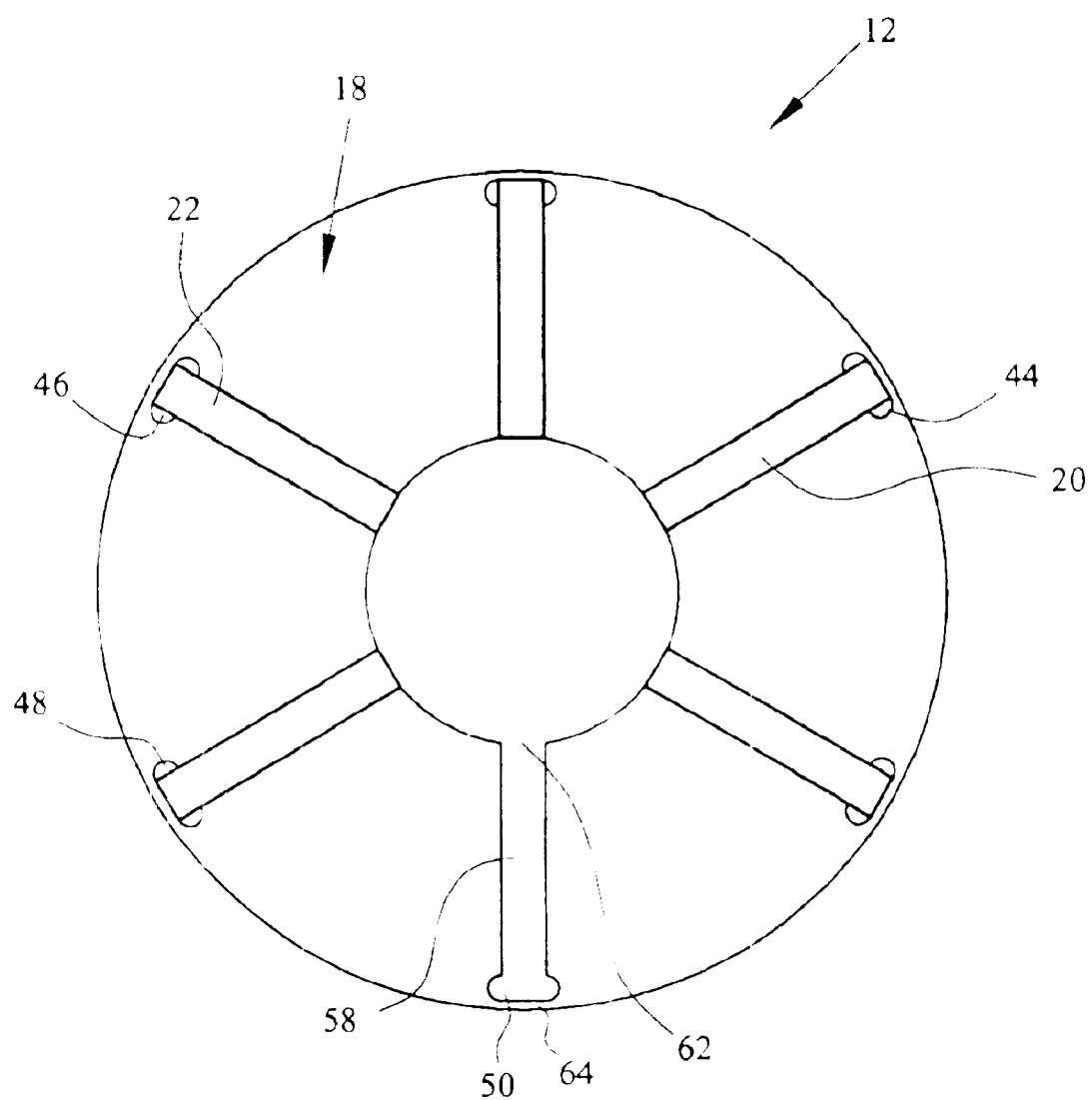
FIG. 2 shows a schematic sectional view through a rotor assembly according to the present invention.

As shown in FIG. 2, the slot 58 has an end section 50 of enlarged widths. This end section can be formed by providing notches or recesses in the end section for varying the widths of each slot. While the permanent magnets 20, 22, 24, 26, 28, 30 are shown to be fully inserted into the end sections 44, 46, 48, 50, 52, 54 in FIG. 1 and 2, an expert will understand that the permanent magnets can extend only partly into said end sections 44, 46, 48, 50, 52, 54 or may stop short of the end sections.

The shape of the end sections, in particular, the widths of the slots at said end sections serves for controlling flux concentration through the pole arc 32 to 42 which is defined between the end sections 44 to 54 of the slots. The wider the end sections are, the smaller is the pole arc between these end sections. Thus, by selecting the shape of the end sections of the slots, the flux distribution in the magnet core and the air-gap can be controlled. Further, by adjusting the length of each magnet 20 to 30 to fully or partly extend into the end sections 44 to 54 or to stop short of said end sections, it is possible to control the induction and the cogging torque of the permanent magnet motor.

FIG. 3 shows a modification of the rotor assembly according to the present invention. The same components are designated by the same reference numbers used in FIG. 2.

Figure 3A:
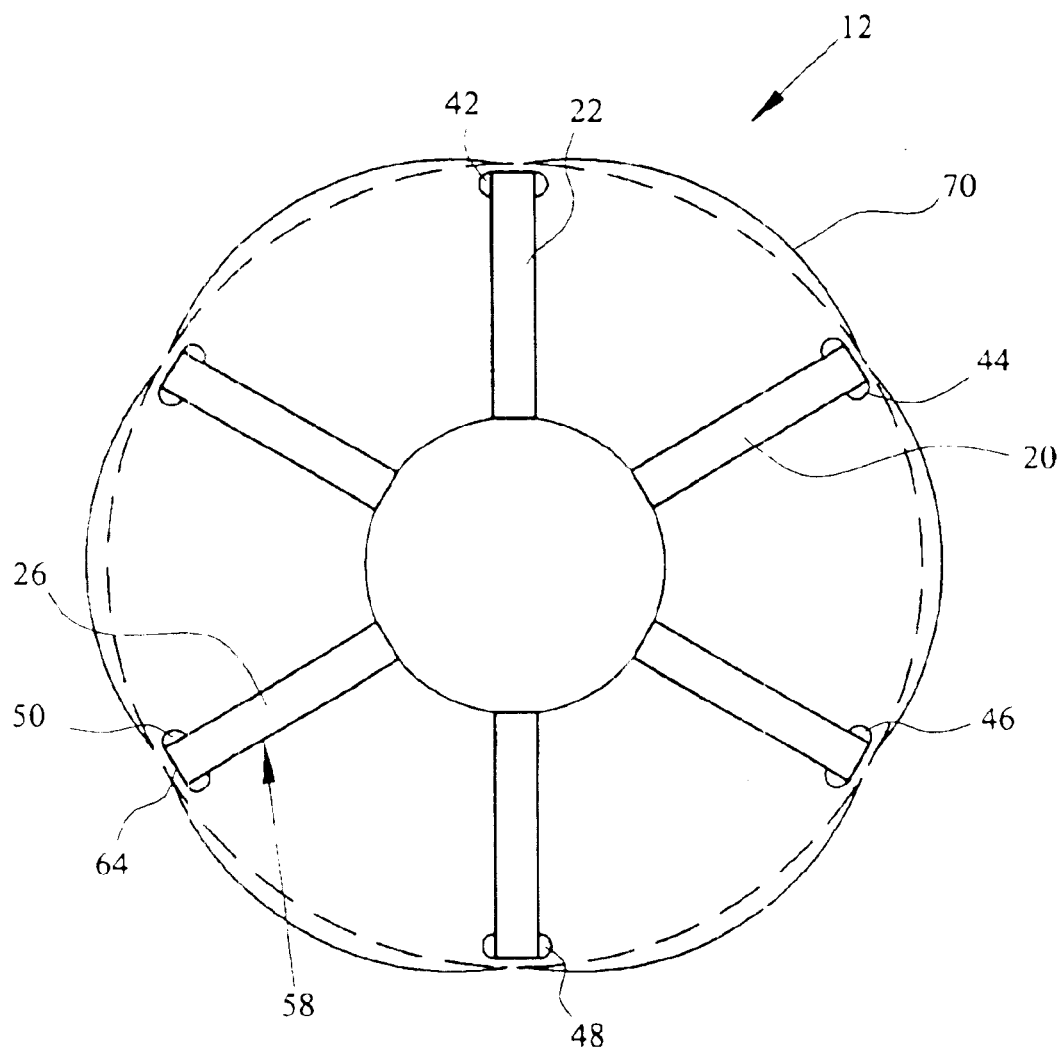
FIG. 3 shows a schematic sectional view through a rotor assembly according to a further embodiment of the present invention.
Figure 3B:
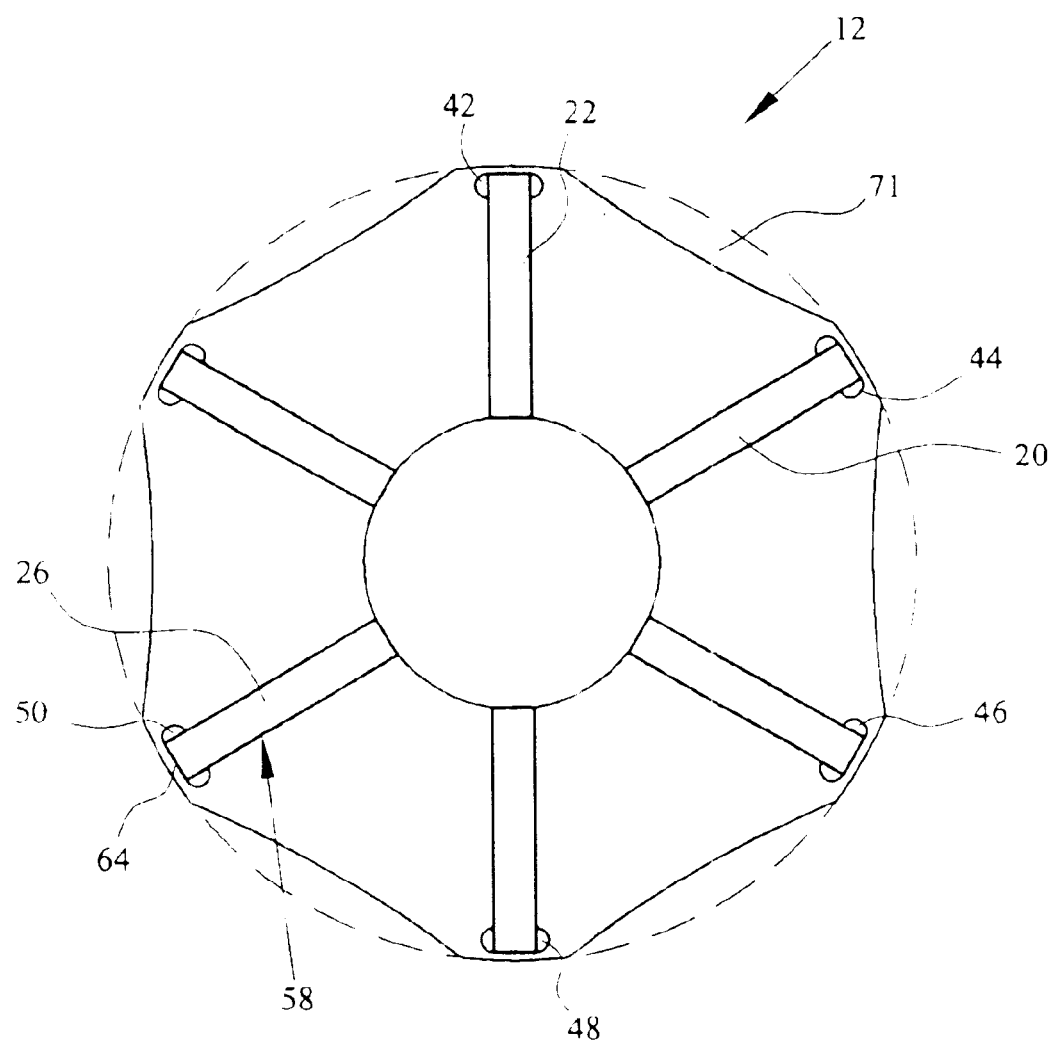

The difference between the embodiments of FIG. 2 and 3 is that the poles 32 to 42 of the rotor body, between the magnets 20, 22, 24, 26, 28, 30 are provided with a convex shape 70. The shape of the rotor body is a further measure to control the distribution of the radial component of the electromagnetic induction in the air-gap. For controlling the electromagnetic induction it is possible to provide convex or concave poles having different shapes. FIG. 3A shows convex shape 70 between Magnets 20 and 42. FIG. 3B shows concave shape 71 between magnets 42 and 42.

Figure 4:
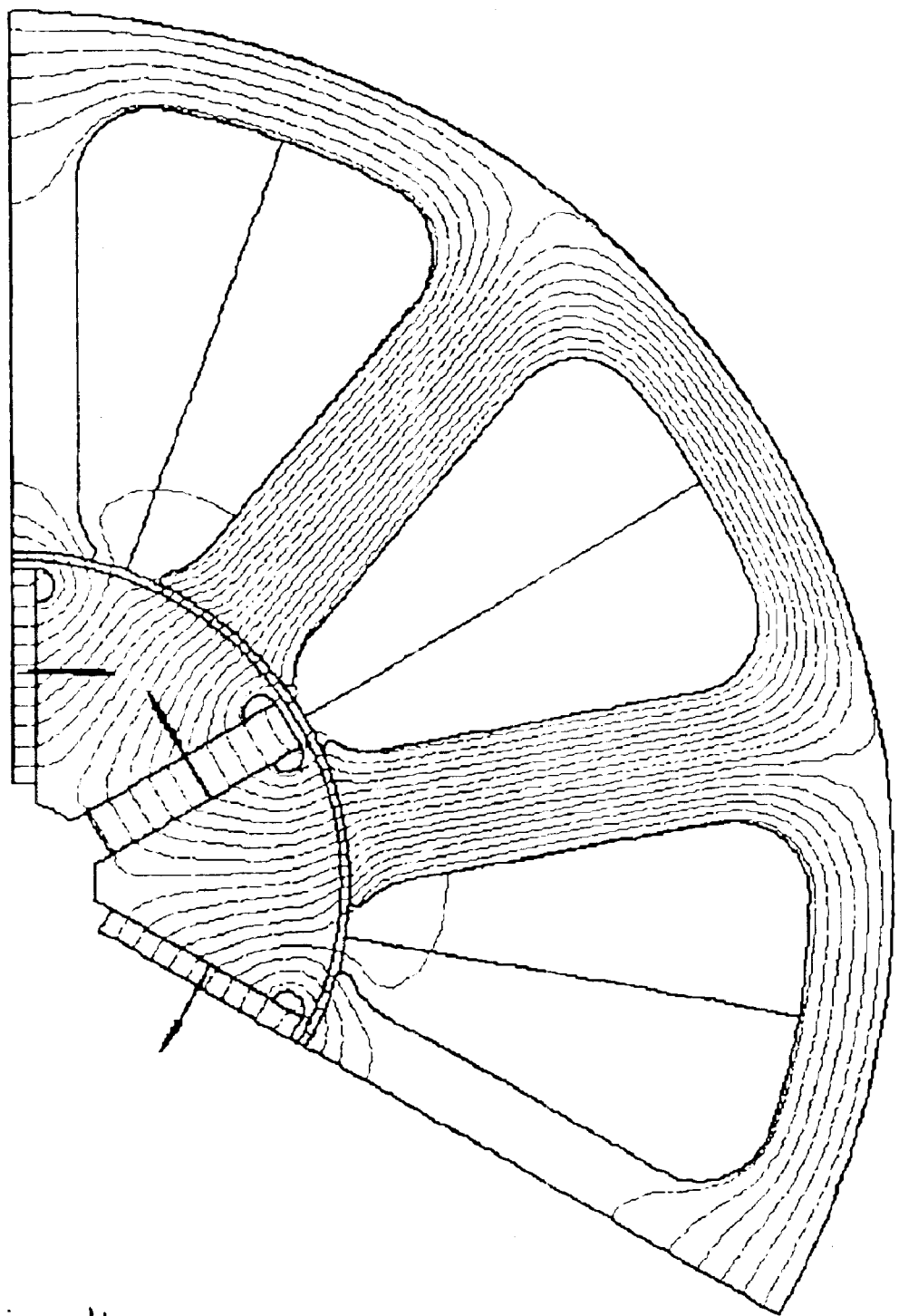
FIG. 4 shows a schematic sectional view through part of the motor of FIG. 1 wherein the magnetic flux is indicated.

FIG. 4 shows a schematic sectional view through a part of the motor of FIG. 1 for illustrating the magnetic flux passing through the magnetic core formed from the rotor body and the stator. FIG. 4 shows how the end sections of the slots having enlarged widths influence the radial distribution of the magnetic flux and, in particular, have a flux concentration effect which also helps for reducing the cogging torque.

An expert will understand that the shape of the end section of the slots can be varied, in particular, it can be made wider or narrower, for adjusting the induction and the cogging torque according to the particular needs of the application.

The features disclosed in the above specification, the claims and the drawings can be relevant for implementing the various embodiments of the present invention when taken alone or in any combination thereof.

What is claimed is:

1. A rotor assembly for an electrical machine comprising:
   a body of generally cylindrical shape said body having an inner opening,
   wherein a plurality of slots are provided in the body, said plurality of slots extending from said inner opening towards the outer periphery of said body, at least one of said slots adapted to receive a magnet;
   wherein at least one of said plurality of slots comprises an end section near the outer periphery of said body, the end section having an area of enlarged width and said slots closed at said end section near the outer periphery of said body.

2. A rotor assembly according to claim 1 wherein said permanent magnets terminate short of said end section.

3. A rotor assembly according to claim 1 wherein said permanent magnets extend into said end section.

4. A rotor assembly according to claim 1 wherein said end section is filled by a medium having no magnetic properties.

5. A rotor assembly according to claim 1 wherein said body comprises a magnetic core.

6. A rotor assembly according to claim 1 wherein said plurality of slots extend generally radially through said body.

7. A rotor assembly according to claim 6 wherein said permanent magnets disposed in said plurality of slots extend generally radially through said body.

8. A rotor assembly according to claim 1, wherein said inner opening is configured for coaxially mounting said body on a shaft.

9. A rotor assembly according to claim 8 wherein said body is mounted on said shaft by a hub.

10. A rotor assembly according to claim 9 wherein said hub comprises a non-magnetic material.

11. A rotor assembly according to claim 1 wherein the outer periphery of said body has a convex shape between two adjacent permanent magnets.

12. A rotor assembly according to claim 1 wherein said plurality of slots include recesses.

13. A rotor assembly according to claim 1 wherein the outer periphery of said body has a concave shape between two adjacent permanent magnets.

14. A permanent magnet motor comprising
   a rotor assembly with a body of generally cylindrical shape having an inner opening; a plurality of slots provided in said body, wherein the slots extend from the inner opening towards the outer periphery of said body and wherein at least one of said slots comprises an end section near the outer periphery of the body said end section having an enlarged width and said slots closed at said end section near the outer periphery of said body; permanent magnets disposed in said slots; and a stator.

15. A method of improving the performance of an electric machine comprised of a stator and a rotor assembly with a body of generally cylindrical shape having an inner opening, the method including the steps of:
   (a) providing a plurality of slots in the rotor assembly wherein the plurality of slots extend from the inner opening towards the outer periphery of the rotor assembly;

(b) disposing permanent magnets in the plurality of slots;

(c) enlarging the area of an end section of at least one of the plurality of slots to thereby improve the performance of the electric machine; and (d) closing said slots at said end section near the outer periphery of said body.

16. The method of claim 15 wherein each slot in said plurality of slots has an area of enlarged width.

17. The method of claim 15 wherein the step of disposing permanent magnets further includes adjusting the length of each permanent magnet.

18. The method of claim 17 wherein adjusting the length of each permanent magnet comprises fully extending the permanent magnet into the end section.

19. The method of claim 17 wherein adjusting the length of each permanent magnet comprises partially extending the permanent magnet into the end section.

20. The method of claim 17 wherein adjusting the length of each permanent magnet comprises no extension of the permanent magnet into the end section.

* * * * *